United States Patent [19]

Anderl et al.

[11] 3,925,782

[45] Dec. 9, 1975

[54] ADAPTIVE RF POWER OUTPUT CONTROL FOR NET RADIOS

[75] Inventors: Josef H. Anderl; George R. Oliva, Jr., both of Eatontown, N.J.

[73] Assignee: The United States of America as represented by the Secretary of the Army, Washington, D.C.

[22] Filed: Feb. 28, 1975

[21] Appl. No.: 554,334

[52] U.S. Cl. .................... 343/178; 325/21; 325/53; 325/62; 325/64; 343/176; 343/204

[51] Int. Cl.²..... H04J 3/12; H04B 1/59; H04B 3/60

[58] Field of Search................ 340/213.1, 226, 408; 343/175, 177, 178, 176, 179, 200, 201, 203, 204; 325/53, 62, 31, 55, 15, 21, 64

[56] References Cited

UNITED STATES PATENTS

| | | | |
|---|---|---|---|
| 2,678,998 | 5/1954 | Young, Jr. | 343/179 |
| 2,877,343 | 3/1959 | Mitchell | 325/53 |
| 2,912,569 | 11/1959 | Shepherd | 325/15 |
| 2,924,703 | 2/1960 | Sichak et al. | 325/64 |
| 3,151,295 | 9/1964 | Haviland | 325/3 |
| 3,529,243 | 9/1970 | Reindl | 325/55 |
| 3,671,865 | 6/1972 | Szumila et al. | 325/58 |
| 3,732,496 | 5/1973 | Boyer | 325/62 |

*Primary Examiner*—Howard W. Britton
*Assistant Examiner*—Marc E. Bookbinder
*Attorney, Agent, or Firm*—Nathan Edelberg; Robert P. Gibson; Kenneth J. Murphy

[57] ABSTRACT

A simplex net communication system for a plurality of radio stations wherein the power output of any given transmitter station in the net is controlled in accordance with power received by the other receiving stations and more specifically reduced to such a level that the signal received at the most remote receiver station is satisfactory. This is accomplished by periodically interrupting the normal transmission of the sending station transmitting an interrogating code to the other receiving stations asking for a power correction request and receiving power correction requests from the other stations sequentially during their allotted time slots. The sending transmitter power is then adjusted to the lowest power reduction request received.

11 Claims, 1 Drawing Figure

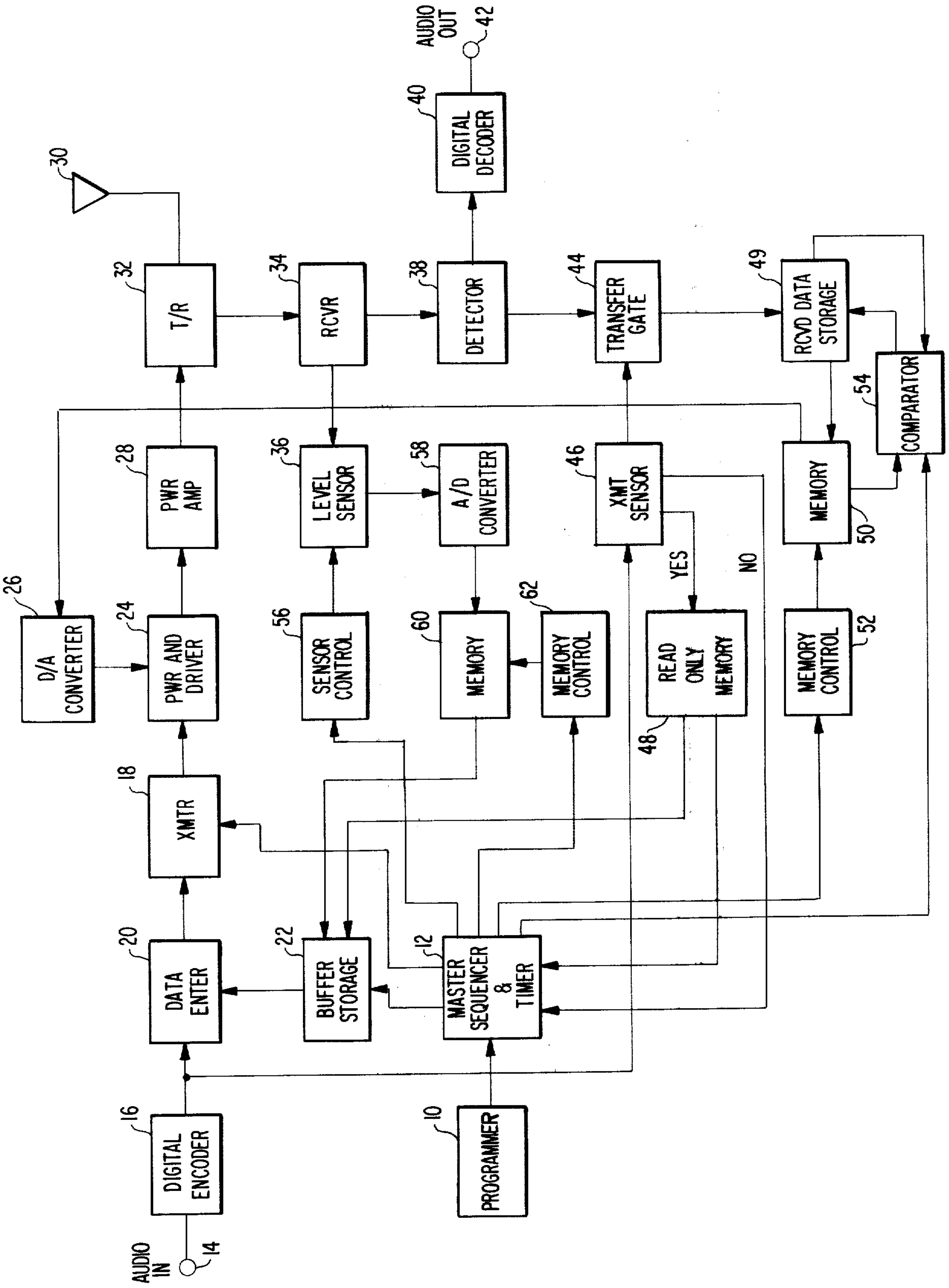
AUDIO OUT
42
DIGITAL DECODER
40
30
T/R
32
RCVR
34
DETECTOR
38
TRANSFER GATE
44
RCVD DATA STORAGE
49
COMPARATOR
54
PWR AMP
28
LEVEL SENSOR
36
A/D CONVERTER
58
XMT SENSOR
46
MEMORY
50
YES
NO
D/A CONVERTER
26
PWR AND DRIVER
24
SENSOR CONTROL
56
MEMORY
60
MEMORY CONTROL
62
READ ONLY MEMORY
48
MEMORY CONTROL
52
XMTR
18
DATA ENTER
20
BUFFER STORAGE
22
MASTER SEQUENCER & TIMER
12
DIGITAL ENCODER
16
PROGRAMMER
10
AUDIO IN
14

ADAPTIVE RF POWER OUTPUT CONTROL FOR NET RADIOS

The invention described herein may be manufactured and used by or for the Government of the United States of America for governmental purposes without the payment of any royalties thereon or therefor.

BACKGROUND OF THE INVENTION

1. Field of the Invention

The present invention relates to digital communication systems and more particularly to a simplex net communication system wherein a plurality of radio stations each including both transmit and receive capabilities are capable of communicating with each other.

2. Description of the Prior Art

Digital communication systems of the type referred to above are particularly adapted to tactical military communication systems utilizing a large number of stations, most of which are mobile and usually confined to a relatively small area. The distance ranges to be covered by net radios can vary for example from a few hundred feet to approximately 25 miles. Typical examples of such systems, moreover, are disclosed in U.S. Pat. No. 3,529,243, A. Reindl and U.S. Pat. No. 3,671,865, A. D. Szumila, et al.

Such radio apparatus almost always operate at their rated power output, notwithstanding the distance separation between units. This results in less than optimal spectrum utilization because co-channel assignments require large geographical separation to avoid mutual interference. Accordingly, full power output capability must be taken into account in the assignment of adjacent channels. While the problem of automatic output control has been solved for full duplex operation wherein transmit/receive apparatus operate on different frequencies simultaneously affording independent operation in opposite directions over the same channel such as taught by the Reindl patent mentioned above, there is currently no known method available for simplex net operation wherein several stations must be able to listen to each transmission and respond if required.

SUMMARY

Briefly, each station in a sequential digital data communication net is adapted for both transmission and reception of communications signals from the other members or participants in the net during its respective sequential time slot. Each station or participant includes means indicating the number of stations in the net and its sequence number in the net. During, for example, the voice transmission mode of any one of the stations an interrogation code will be sent to the other stations which are then in a receiving mode. The interrogation code is a digital signal indicating that normal transmission will be interrupted at a certain time later and requesting any power reduction from the receiving stations be sent back at that time. The receiving stations measure the received power and in turn respond by transmitting a power correction request in the form of a digital code back to the transmitting station in their assigned time slots which requests are consecutively compared and a transmit power adjustment automatically made in said one station in response to the lowest power reduction request made. The interruption of transmission is of a relatively short duration such that it is undetectable during the time voice signals are being communicated.

BRIEF DESCRIPTION OF THE DRAWING

The drawing shows a block diagram of the invention.

DESCRIPTION OF THE PREFERRED EMBODIMENT

Referring now to the drawing, the block diagram is illustrative of the elements contained in each of a plurality of identical digital data communications radio stations including both transmitting and receiving apparatus. These stations are particularly adapted for voice communication between other like stations in a net wherein the participants must be able to listen to each transmission and respond if required. Each station can be both a transmitter interrogator and a receiver/responder but not both during any one operational power adjustment of a station in the net. Reference numeral 10 designates means such as a programmer wherein data is fed indicating the number of stations in the net and the sequence number or time slot of the subject station with respect to the other stations in the net. This data is coupled to a master sequencer and timer unit 12 for properly operating the equipment during its respective time slot whether it be a transmitting/interrogator station or a receiving/responder station. The unit 12 in other words constitutes a synchronizer for the station's overall operation. During operation as transmitter/interrogator station, a voice or other analog communications input signal is applied to terminal 14 where it is coupled to a digital encoder 16 wherein the analog input signal is transformed into a digital signal comprised of a series of digital words in a manner well known to those skilled in the art. The digital coded communications signal which is to be transmitted is coupled to an RF transmitter section including transmitter means 18 by means of a digital data enter device 20 which is also adapted to insert an interrogation code into the transmitted data stream at a predetermined time from a buffer storage 22 under the control of the master sequencer timer 12. The device 20 may comprise, for example, digital time delay means and transfer gate. The transfer of the digital communications signal is thus adapted to be interrupted periodically by the data enter device 20, so that an interrogation code provided by the buffer storage can be coupled to the transmitter section.

The output of the transmitter means 18 is fed to an electronically controlled RF power amplifier driver 24 which is controlled in accordance with the output of a digital to analog converter 26 in a manner to be described subsequently. An RF output power amplifier 28 connected to the output of the driver 24 is coupled to suitable antenna means 30 by way of a transmit/receive (T/R) switch device 32. A receiver section including receiver means 34 is also connected to the T/R device 32. The receiver means 34 is coupled both to a power level sensor 36 which is utilized when the station is operating as a receiver/responder station, and to detector means 38 which consists of a digital data demodulator adapted for providing not only outputs of received digital communications signal when operating as a receiver/responder but also a digital data signal corresponding to a request for power reduction from the other participants in the net when operating as a transmitter/interrogator. Any digital communication signal e.g. a voice signal, is coupled to a digital decoder 40 which comprises a digital to analog converter for providing an analog output signal at terminal 42. Any digital data signal corresponding to a request for power reduction from the other receiver/responder participants in the net during the instant station's transmit mode is coupled to a transfer gate 44 which is controlled by means of a transmit sensor circuit 46 which in turn is responsive to the station's operational mode and as such is coupled, for example, to the output of the digital encoder 16. The transmit sensor circuit 46 couples control signals additionally to a read only memory 48 and to the master sequencer/timer 12 depending upon whether the instant station is transmitting i.e. acting as a transmitter/interrogator or not transmitting, i.e. acting as a receiver/responder.

When transmitting the transfer gate 44 is adapted to sequentially couple requests for data reduction from the other participants in the net which are in the form of a binary coded signal to a temporary data storage 49. Operating in conjunction with the temporary data storage 49, is a memory 50 under the control of a memory control unit 52 operated in accordance with control signals from the master sequencer and timer 12, as well as a digital comparator unit 54, also under the control of the master sequencer and timer 12.

Assuming now that the instant station is operating as a transmitter/interrogator station and suitable data has been entered into the programmer 10 wherein each participant in the net is identified by its position in a timing sequence, the transmit sensor unit 46 will couple a control signal to the read only memory 48 indicating that the respective apparatus is a transmitter/interrogator station. The read only memory 48 accordingly loads a digitally coded interrogation signal to the buffer storage 22 as well as an alert signal to the master sequencer and timer 12. The master sequencer and timer 12 being fed information as to its own time slot by the programmer 10 sends a control signal to the buffer storage 22 at an appropriate time to enter the digitally coded interrogation signal to the data enter device 20 which is adapted to inhibit or suitably delay the digital communications signals from the encoder 16. The interrogation code is accordingly coupled to the transmitter 18 where it is suitably amplified and sent to the other participant stations in the net which are operating as receiver/responder stations. The interrogation code instructs them to respond by transmitting any desired power level reduction from the transmitter/responder station during their respective time slots. Each receiver/responder station in turn replies by transmitting a digitally coded request for power reduction. This request signal appears at the receiver 34 of transmitter/interrogator station where it is coupled into the data storage 49.

The request from the first participant to respond is immediately fed to the memory 50. The request from the second participant to answer is subsequently fed to the data storage 49 and a comparison is made between the first and second request in the comparator 54. If the comparison between the first and second request is such that the second request is for a lesser reduction, it will be transferred to the memory 50 and the first entry discarded. The comparison operation continues sequentially with each incoming request from the remaining receiver/responder stations during their allotted time slot such that the lowest request for power signal will end up in the memory 50 at the end of the interrogation sequence, at which time the memory control 52 will cause the content of the memory 50 to be transferred to the digital to analog converter 26, which generates a suitable control signal for varying the drive level of the electronically controlled driver 24, thus controlling the power output of the power amplifier 26 applied to the antenna 30.

During pre-programmed intervals of subsequent sequences the transmitted power is allowed to rise slowly. Following each power rise, the interrogation code contained in the read only memory 50 will again be sent to other receiver/responder stations and output power correction of the transmitter/interrogator will be repeated, always in a decreasing fashion, providing constant updating of transmitted power in order to take into consideration possible changes in propagation conditions such as weather, position, and distance, etc. thus ensuring that all net stations are maintaining contact at optimum power levels.

Considering now the situation wherein the apparatus shown in FIG. 1 operates as a receiver/responder station, the transmit sensor unit 46 couples a "no", i.e. "not transmitting" signal to the master sequencer and timer 12, which then couples a control signal to a level sensor control circuit 56, which circuit is adapted to turn on the level sensor 36. The sensor 36 measures the power level received from the transmitter/interrogator station and generates a power change request signal in response to the power level received. The request signal is coupled to an analog to digital converter 58, which generates a digital coded signal corresponding to the request for power reduction in accordance with the received power level. This digital signal is loaded into the memory 60, whose memory control unit 62 is controlled by the master sequencer and timer 12 whereupon at a predetermined time the contents of the memory 60 are fed to the buffer storage 22 and during its appropriate time slot as determined by the programmer 10, the request signal in the buffer storage 22 is transmitted back to the transmitter/interrogator station.

For purposes of further illustration of the net operation, assume for example that there are ten stations in a net and that the maximum distance coverage is required to be 32 kilometers (km). The minimum distance for which regulation of power output is desired is assumed to be 1 km. The ratio of maximum to minimum distance is 25 or 5 octaves. Therefore, if the average path attenuation increases by 12 dB/octave, a control range of 60dB is required. If the power output is adjusted in steps of 4dB, a total of 15 steps is required. Accordingly a 4 bit binary code is sufficient to convey the desired control information. At a rate of 16 kilobits per second, the transmission of 4 bits requires 4/16 milliseconds or 0.25 milliseconds. The propagation time for a distance of 30 km is 0.1 millisecond or 0.2 millisecond for a round trip. If more stations are to respond sequentially, each station requires a minimum of 0.5 milliseconds and a total of at least 4 milliseconds is thus required. Since envelope delay of approximately 1 millisecond occurs at each end of transmission within the equipment, an additional 2 milliseconds must be allowed. Furthermore, for a practical implementation, some additional guard time must be allowed between sequential responses. Also, some redundancy is probably desirable in order to insure transmission of correct information.

Assuming further that the first station commences transmission at full power output as a transmitter/interrogator station to the other nine net stations, after a certain period of time, in the order of 100 milliseconds, a digital code from the read only memory 48 of the first station will be sent, indicating that its transmission will be interrupted in exactly $x$ milliseconds, and requesting power correction information be provided from the other nine receiver/responder stations in sequence. This alert signal will start the proper sequencing of the remaining net stations. After $x + 2$ milliseconds, the second station in its allotted time sequence located for example 4 km from the control station transmits a 4 bit word plus any necessary redundancy bits requesting a 36 dB power reduction from the transmitter/interrogator station. This responder transmission is made at a power level which is 36 dB below maximum power. The transmitter/interrogator station stores this information in its memory 50. After $x + 2.75$ milliseconds, the third station in the net located for example 8 km from the transmitter/interrogator station transmits a request for a 24 dB power reduction. This transmission is made at a power level 24 dB below maximum power. The station compares the two requests for power and applies the smaller request in the memory 50. The remaining fourth through tenth receiver/responder stations respond in turn every 0.75 milliseconds with a request for power reduction. At the end of the interrogation sequence, the smallest reduction request is contained in the memory 50 of the first or transmitter/interrogator station which then operates to reduce the output of the power amplifier 26 as previously described. The interruption in transmission from the first station required an interruption of approximately 10 milliseconds. Such an interruption in such a short duration is hardly discernable and can easily be fitted into speech pauses. While the first or transmitter/interrogator station is continuing its transmission, its power is allowed to rise slowly again to compensate for any possible degradation in propagation conditions until a new interrogation sequence is initiated.

Thus what has been shown and described is a digital data net communication system wherein the transmission from one of the stations defined as a transmitter/interrogator is periodically interrupted for short periods of time and correction information received from a plurality of receiver/responder stations in sequence, whereupon the smallest requested correction of transmitted power is applied to the transmitter portion of transmitter/interrogator station. Such a system has the advantages that it becomes relatively insensitive to attempts at exploiting the system for countermeasure purposes. Additionally, it provides a reduction of mutual interference with an attendant increase in spectrum utilization. It is also possible that lower average power consumption results, which factor is particularly important in manpack operation.

Having thus described what is at present considered to be the preferred embodiment of the subject invention,

We claim:

1. A simplex data net communication system comprised of a plurality of like participant radio stations operating in a predetermined ordered time sequence wherein at least one station operates as a transmitter/interrogator station which interrupts its transmission of communications signals to the other stations of said plurality respectively operating as receiver/responder stations and interrogates said other stations as to the respective power received from said one station and said other stations respond in their proper time slot to said one station requesting a desired change in transmitted power from said one station, each said participant radio station including as a transmitter/interrogator station;

transmitter and receiver sections alternately coupled to an antenna;

means programmed with data as to the number of said plurality of participants in the net and its respective time slot in the overall operational time sequence of the system;

timing and control means coupled to said programmed means and being operable in response to said data to provide synchronized operational control signals for said station according to its respective time slot;

means coupling a digital interrogation code signal periodically to said transmitter section during said respective time slot in response to control signals from said timing and control means while temporarily suspending normal communications signal transmission, said interrogation code signal being transmitted to said other stations causing said other stations to respond in their respective time slot with a digital coded request signal for a power correction from said transmitter/interrogator section;

means coupled to said receiver section for sequentially receiving and storing each said digital coded request signal from said other stations;

means comparing each digital coded request signal with the next subsequently received digital coded request signal and retaining the request signal for the lesser power correction until all digital coded request signals have been received in sequence from said other stations; and means coupled from said comparing and retaining means to said transmitter section, being operable to cause a change in the transmitted power output of said transmitter section in response to the digital coded request signal for the least power correction change.

2. The communication system as defined by claim 1 and additionally including:

means coupled to and responsive to the operation of said transmitter section, providing a first type control signal during the transmitter/interrogator mode and a second type signal during the receiver/responder mode; and wherein said means coupling said interrogation code signal to said transmitter section comprises a digital memory having a fixed interrogation code contained therein and a buffer storage unit coupled to said memory, said memory additionally being coupled to said means providing said first and second type control signals and being responsive to said first type control signal to transfer the fixed interrogation code to said buffer storage and additionally providing an output coupled to said timing and control means for causing the interrogation code to be coupled to said transmitter section from said buffer storage.

3. The system as defined by claim 2 wherein said memory comprises a read only memory.

4. The system as defined by claim 2 wherein said transmitter section includes a digital encoder having means for the application of analog input communications signals thereto and means coupled between said digital encoder and said buffer storage, being operable to interrupt the output of the digital encoder at a predetermined time within the respective slot and couple the interrogation code signal to the transmitter section.

5. The system as defined by claim 2 wherein said means coupled to said receiver section for sequentially receiving and storing digital coded request signals from said other stations includes:

digital signal detector means coupled to said receiver section;

a digital data storage; and controlled digital data transfer means coupled between said detector means and said digital data storage and being controlled by said means providing said first and second type control signals, being responsive to said first type control signal to couple digital coded request signals from said detector means to said storage.

6. The system as defined by claim 5 and wherein said means comparing and retaining each digital coded request signal for the least power correction request comprises:

a digital comparator circuit coupled to said digital data storage; and a digital memory and a control circuit therefor coupled to said comparator and said data storage, said control circuit being coupled to said timing and control circuit means for operating said memory to read out the request for the least power correction change at the end of a time sequence.

7. The system as defined by claim 6 wherein said transmitter section includes electrically controlled power amplifier driver circuit means and wherein said means coupled to said transmitter section for changing the transmitted power output comprises a digital to analog converter coupled to and responsive to the output of said last recited memory during read out.

8. The system as defined by claim 2 and wherein each station includes as a receiver/responder station:

power level sensor means coupled to said receiver section for providing a signal indicative of the measure of the received power level transmitted from another transmitter/interrogator station of said plurality of stations;

control means coupled between said timing and control means and said power level sensor means for rendering said power level sensor means operative;

digital signal generating means coupled to said level sensor providing a digital coded request signal indicative of a desired reduction in power transmission from said another transmitter/interrogator station; and means coupling said digital coded request signal to said transmitter section, said transmitter section becoming operative in response to control signals from said timing and control means during its respective time slot for transmitting said coded request signal back to said another transmitter/interrogator station.

9. The system as defined by claim 8 wherein said power level sensor means is adapted to provide an analog signal output and, wherein said digital generator means comprises analog-to-digital converter means adapted to provide said digital coded request signal to said transmitter means; and wherein said coupling means comprises a memory including control circuit means coupled to the timing and control means and said buffer storage coupled to the memory, said buffer storage being controlled by said timing and control means to transfer the contents of said memory to said transmitter section.

10. The system as defined by claim 9 and additionally including, digital signal detector means coupled to said receiver section for detecting a digital communication signal transmitted from said another transmitter/interrogator and providing a digital communications signal output, and digital decoder means coupled to said detector means for providing an analog communication output signal.

11. The system as defined by claim 10 wherein said digital decoder comprises a digital-to-analog converter.

* * * * *